INVENTORS
LOWELL E. JOHNSON
ROBERT C. HANSEN
SHAIRYL I. PEARCE
CHARLES E. LANCHANTIN, JR.

INVENTORS
LOWELL E. JOHNSON
ROBERT C. HANSEN
SHAIRYL I. PEARCE
CHARLES E. LANCHANTIN, JR.
BY
ATTORNEYS

3,478,621
TORQUE CONVERTER AND CONTROL SYSTEM THEREFOR

Lowell E. Johnson and Robert C. Hansen, East Peoria, Shairyl I. Pearce, Highland Hills Estates, East Peoria, and Charles E. Lanchantin, Jr., Peoria, Ill., assignors to Caterpillar Tractor Co., Peoria, Ill., a corporation of California Filed May 8, 1968, Ser. No. 727,620
Int. Cl. F16h *47/08*
U.S. Cl. 74—688                     45 Claims

ABSTRACT OF THE DISCLOSURE

One of the stator and impeller members of a torque converter is divided into two elements so that one element may rotate relative to the other. A control system comprising fluid pressure signal means is operatively associated with one of the elements to control relative rotation occurring therebetween to infinitely vary the power absorption capability of the torque converter within a predetermined range.

---

Modern day earthmoving vehicles, for example, exhibit a growing need for variable capacity torque converters due to separate demands for engine power occurring during various operating phases of vehicle operation. A typical example involves wheel or track-type loaders which constantly cycle between loading and traveling phases of vehicle operation. During such loading phase an implement, such as a loader bucket, demands a large portion of the engine's horsepower output whereas the horsepower required by the vehicle's ground engaging wheels is proportionately small. Conversely, when the loader is in its traveling phase of operation such horsepower demands are substantially reversed.

Conventional torque converters generally exhibit single torque absorption rates which may function to excessively load the engine during the loading phase of loader operations, for example. Oftentimes the operator finds that insufficient engine horsepower is available to him for the efficient actuation of the loader bucket to accomplish the particular loading operation in question. Various solutions have been proposed to resolve such problem. For example, the engine and related machine components may be "overdesigned," resulting in a complex and costly torque converter and control system therefor. Also the torque converter could be designed to comprise various overrunning clutches, multibladed and variable pitch elements, etc., in an attempt to achieve stepped torque converter power absorption rates.

A general object of this invention is to overcome the above, briefly described problems by providing a non-complex and highly reliable torque converter in combination with means for efficiently and expeditiously varying the power absorption capability thereof. The torque converter embodiments hereinafter described lend themselves to precise and infinite control throughout a predetermined range of torque converter power absorption capability. Thus, the desired engine speed and power may be maintained regardless of the form of engine power requirements. Otherwise stated, the torque converter and control system of this invention afford full utilization of engine horsepower and will match such horsepower to various power takeoff requirements, such as the loader bucket power requirements discussed above.

The torque converter of this invention essentially comprises means operatively connectable with at least one of its stator and impeller or pump means for infinitely varying the power absorption capability thereof. In the preferred embodiment, one of the reactor and impeller means comprises at least two elements mounted in the torque converter so that one element may rotate relative to the other one. A control system comprising signal means may be used with the torque converter for generating a variable signal to control rotation of the one element relative to the other one. Thus, the power absorption capability of the torque converter may be closely controlled within a predetermined range in response to the pressure level generated by such signal means.

Further objects of this invention will become apparent from the following description and accompanying drawings wherein.

Figure 1:
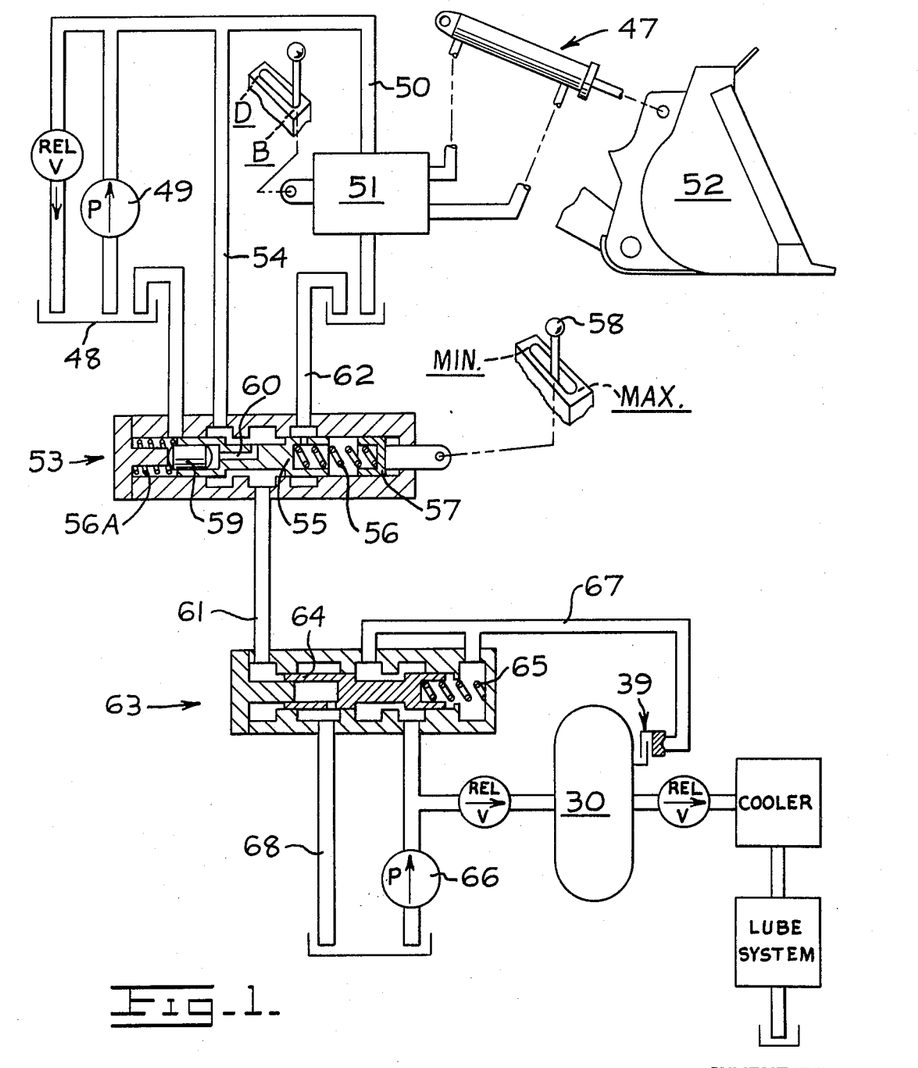
FIG. 1 schematically illustrates a torque converter having a multielement reactor and control system therefor comprising actuating means for moving an implement.

FIG. 1 illustrates a torque converter 30 and first control system embodiment therefor. Torque converter 30 may comprise the polyphase, single-stage torque converter embodiment illustrated in FIG. 2. Such embodiment comprises turbine means 31, reactor or stator means 32 and pump or impeller means 33 suitably constructed and arranged to multiply torque in a powered drive train. A power input means 34 may comprise the driven flywheel of an internal combustion engine (not shown), for example. The impeller may be suitably mounted for rotation in the torque converter by spaced bearing means 35 and 36.

The turbine is secured to a power output means or shaft 37 by suitable spline connections to rotate therewith. The torque converter further comprises a sationary housing 38, partially shown in FIG. 2. Connecting means comprising a brake 39 is operatively connectable to a first element 40 of the stator means to infinitely vary the torque converter's power absorption capability within a predetermined range. It should be noted that torus flow circulation is normally counterclockwise in FIG. 2. The brake may comprise a friction disc 41 suitably splined at 42 for limited axial movement on element 40.

Figure 2:
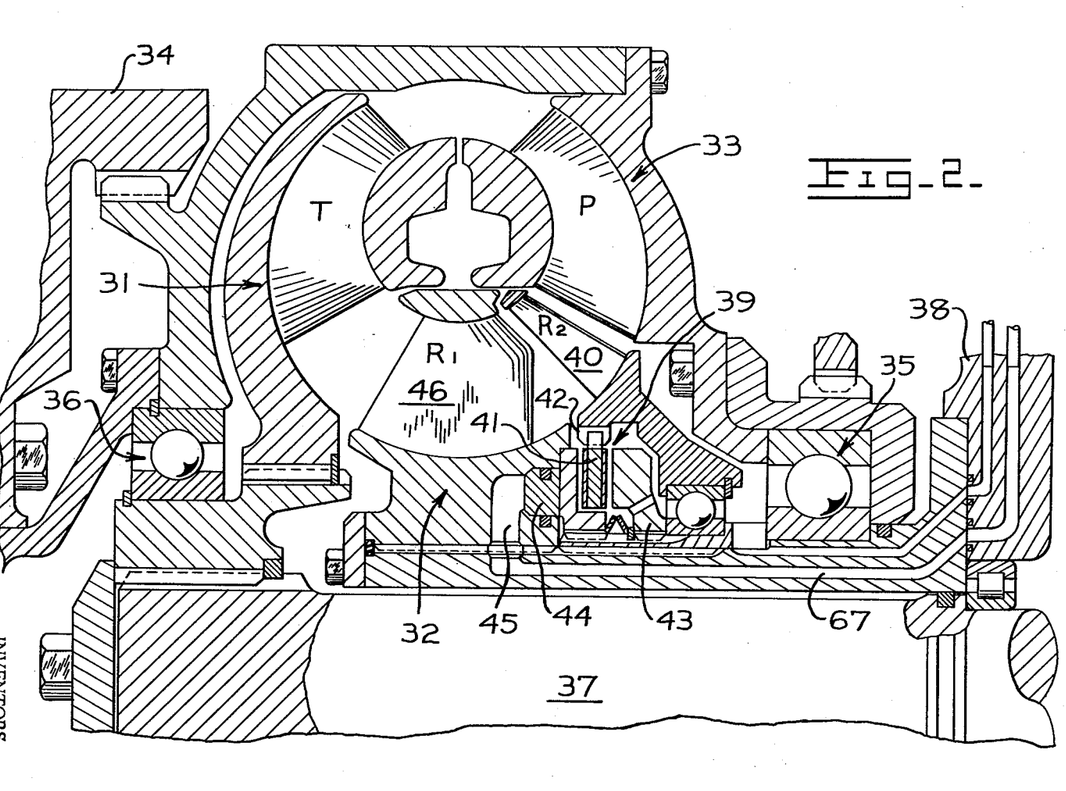
FIG. 2 is a cross-sectional view of a torque converter embodiment comprising a multielement reactor.

The brake further comprises a stationary backup plate 43, secured to housing 38, and a reciprocal piston member 44. Thus, selective pressurization of a chamber 45 will function to arrest element 40 to control rotation thereof relative to a second element 46 of the stator means. The latter element may be fixed relative to stationary housing 38 in a conventional manner or could have brake 39 operatively associated therewith if so desired. Element 40 is secured to an annular member rotatably mounted on housing 38 by suitably arranged bearing means, as illustrated.

As will be hereinafter more fully described, actuating means 47 of FIG. 1 comprises a signal means for generating a variable signal for infinitely varying the power absorption capability of the torque converter by closely controlling the slippage of brake 39. Means comprising a reservoir 48, a pump 49, a conduit 50 and a tilt valve 51 are ararnged for selectively communicating pressurized fluid to the actuating means. As schematically illustrated, the rod end of the actuating means may be mechanically connected to an implement 52, such as a loader bucket, to control movement thereof in a conventional manner.

Fluid pressure in conduit 50 is communicated to a throttling valve means 53 of the control system via a conduit 54. The throttling valve may comprise a spool 55 reciprocally mounted in the bore of a housing thereof and biased in a leftward direction by a coil spring 56 and urged rightwardly by spring 56a. A plunger 57 may be reciprocally mounted in the bore and mechanically connected to a handle means 58 to manually set the spring force urging spool 55 leftwardly. Once the handle is set in a particular position, the system will automatically function within predetermined MAX. and MIN. slip limits to control brake slippage. Maximum engine horsepower is transmitted to the vehicle's wheels at the MAX. position whereby brake 39 is disengaged.

A slug 59, slidably mounted in the left end of the spool, forms a substantially closed chamber with the spool adapted to have fluid pressure communicated thereto via restricted passage 60. Pressurized fluid will flow from conduit 54 past the suitably formed lands and cutouts of spool 55 and into an outlet conduit 61 when the spool assumes its FIG. 1 position. Valve 53 further functions as a pressure modulating reducing valve in that orifice 60 will permit fluid pressure to build up in the chamber formed between the slug and the spool to urge the spool rightwardly.

Sufficient rightward movement of the spool will function to relieve fluid pressure from conduit 61 to an exhaust conduit 62. Such relief allows prompt reduction of regulated pressure in conduit 61 when the operator moves handle means 58 to MAX. Otherwise stated, the throttling valve limits the effect of implement pressure on brake 39. When handle 58 is positioned at MIN. the valve does not regulate (unless fluid pressure in conduit 54 becomes extreme) since the spring loading overpowers it.

However, when moved towards the MAX. position the valve is conditioned to regulate at increasingly lower maximum implement system pressures. When plunger 57 moves to the right in FIG. 1 the valve prevents fluid pressure in conduit 61 from exceeding 1200 p.s.i., for example. However, the point whereat brake 39 initiates engagement remains the same.

A ratio-valve means 63 may comprise a spool 64 slidably mounted in a housing thereof and urged in a leftward direction by a coil spring 65. Pressurized fluid from conduit 61 may be communicated to the left end of the latter valve spool to urge it rightwardly against the force of the spring. A pump means 66 functions to communicate pressurized fluid to the torus of the torque converter and also to brake actuating chamber 45 (FIG. 2) via the ratio-valve means and a conduit 67. Rightward movement of spool 64 to effect the latter communication is in direct response to the variable fluid pressure signal occurring in conduit 61 and acting on the left end of spool 64.

Pump means 66 may be common with pump means 49 or may be operated separately. An exhaust conduit 68 is arranged to relieve brake chamber 45 when the fluid pressure in conduit 61 falls below a predetermined level. A pressure relief valve may be located getween the pump and torque converter to supply the torque converter with 100 p.s.i. fluid pressure, for example. The illustrated pressure relief valve located between the torque converter and cooler may be set to relieve at 60 p.s.i., for example.

In operation, actuation of valve 51 by movement of its control handle to its B or rack-back position (FIG. 1) will function to retract the rod end of actuator 47. Such rack-back position may be utilized when the vehicle is conditioned for its working or bucket loading phase of operation, for example. Handle 58 may be preset by the operator to its desired position between the illustrated MAX. slippage position whereat maximum power is transmitted to the vehicle's ground-engaging wheels and the MIN. position.

Fluid pressure in line 50 will increase over a predetermined level in response to a fluid pressure increase in the hydraulic implement circuit, i.e., in the tilt and/or lift arm cylinders. Such increased fluid pressure signal will be communicated through conduit 54, throttling valve 53, conduit 61 and to servo-valve 63 to move spool 64 rightwardly to its FIG. 1 position. Pressurized fluid from pump 66 will then communicate with brake chamber 45 via conduit 67 to retard rotation of element 40 relative to stationary element 46. Thus, the power absorption capability of the torque converter will be lowered in direct proportion to the increased fluid pressure signal occurring in conduit 50.

Conversely, when the control handle for valve 51 is moved to its D position actuating means 47 will extend for dumping or like purposes. During such phase of vehicle operation the power demand for driving the vehicle could be relatively high whereas the power demand for implement 52 could be proportionately low. Upon such extension of actuator 47, the relatively low fluid pressure in conduit 61 will permit spring 65 to move spool 64 leftwardly.

Thus, supply of pressurized fluid from pump 66 to the brake chamber will be reduced whereas the chamber will be simultaneously placed in at least partial communication with exhaust conduit 68. Consequently, the torque converter's power absorption capability will increase the desired amount. From the above, it can be seen that slippage of brake 39 and thus the amount of relative rotation occurring between 40 and 46 will infinitely vary within a predetermined range in response to the preset range of pressure levels generated in conduit 50 by actuating means 47. The range between maximum and minimum slippage could, for example, approximate twenty-five percent of the torque converter's power input.

A series of suitably arranged detent means (not shown) could be associated with handle 58 to retain it at a particular operating position upon release thereof by the operator. However, in the preferred embodiment coil spring 56a (FIG. 1) is employed between the housing of valve 53 and spool 55 to urge the spool rightwardly. Such urging is aided by spring 56 to normally move the handle to the MAX. position upon release by the operator whereby maximum slip is allowed to occur in brake 39.

Figures 3, 4:
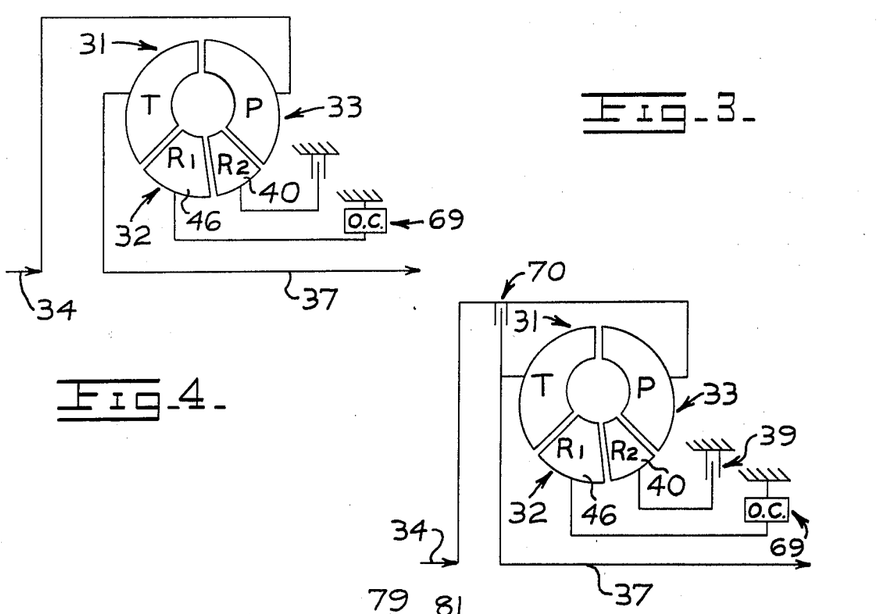
FIGS. 3 and 4 schematically illustrate further torque converter embodiments, each of which comprises a multielement reactor.

FIG. 3 schematically illustrates a torque converter embodiment further comprising an overrunning clutch 69 suitably connected to element 46 to provide increased torque converter efficiency at higher speed ratios, i.e., turbine to impeller speed ratios. Stator element 46 will thus function as a reactor initially, but at higher turbine speeds the resultant direction of flow from turbine 31 will cause element 46 to overrun or free wheel. The torque converter will thus approach the characteristics of a fluid coupling to increase the overall efficiency thereof.

FIG. 4 schematically illustrates a torque converter embodiment further comprising a lockup clutch 70 adapted to be actuated by suitable control means (not shown) to selectively lock input means 34 to turbine means 31. Thus at high speed ratios, such as those encountered at the higher traveling speeds of the vehicle, efficiency of the power train may be improved by mechanically connecting the impeller and turbine elements together. Overrunning clutch 69 may also be employed in such embodiment if so desired. When clutch 70 is engaged, brake 39 would normally disengage to permit free wheeling thereof along with overrunning clutch 69.

Figure 5:
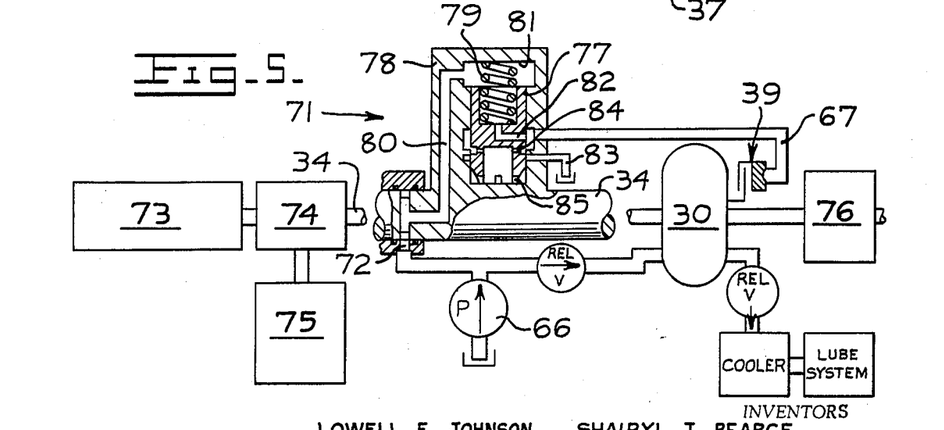
FIG. 5 schematically illustrates a centrifugal control system for use with the FIGS. 2–4 torque converter embodiments.

FIG. 5 schematically illustrates a further control system embodiment for the torque converters illustrated in FIGS. 2–4. The fluid pressure signal means for this embodiment comprises centrifugal control means 71 operatively connected to power input means 34 to rotate therewith. Reservoir and pump means are provided for communicating pressurized fluid to an inlet 72 of the centrifugal control means. The centrifugal control means functions to communicate such fluid to brake 39 to control the amount of relative rotation occurring between elements 40 and 46 (FIG. 2) in response to the speed of rotation of power input means 34.

An internal combustion engine 73 or other suitable power source may be arranged to drive input shaft 34 via a suitably arranged gear train 74 in a conventional manner. The power takeoff from the gear train may be arranged to actuate an implement system drive schematically illustrated at 75. The implement system drive may comprise an elevator drive system for a conventional wheel tractor-scraper, for example. It can be seen that the implement system drive will reflect engine speed directly.

On the other hand, the engine power transmitted to the vehicle's ground-engaging wheels (not shown) via a transmission 76 is downstream of torque converter 30 so that a lowered torque converter power absorption rate would normally decrease drive to such wheels. Centrifugal control means 71 functions to efficiently apportion engine power between the implement system drive and the vehicle's wheels in a manner hereinafter more fully described. The centrifugal control means preferably comprises a valve having a spool 77 reciprocally mounted in a housing 78.

The housing is attached to input means 34 to rotate therewith, similar to the manner by which a housing 178 is attached to input means 134 of a later described FIG. 15 control system embodiment. The spool is arranged to move radially outwardly relative to the longitudinal axis of the torque converter upon increased rotation of power input means 34. Spring means 79 may be operatively associated with the spool in the manner shown to urge the spool radially inwardly relative to such longitudinal axis.

Oil or other suitable working fluid supplied to the valve via inlet 72 is selectively communicated to brake 39 via passage 80, chamber 81, port 82 and conduit 67. An exhaust port 83 is arranged to selectively communicate brake chamber 45 (FIG. 2) with a reservoir via ports 84 and 85 as will be hereinafter described. It can be further seen that the fluid pressure prevalent in chamber 81 will substantially equal the supply pressure at inlet 72 plus the pressure occasioned by centrifugal force imparted to the oil column in passage 80 upon rotation of input shaft 34.

In operation and with the r.p.m. of input means 34 maintained below a predetermined amount, spring 79 will normally bias valve spool 77 radially inwardly to its FIG. 5 position. Thus, pressurized fluid will be communicated to brake chamber 45 (FIG. 2) via inlet 72, passage 80, chamber 81, port 82 and conduit 67 to cause at least partial engagement of brake 39 in response to rotation of the input means. Consequently, the torque converter's power absorption capability will be decreased to a predetermined level during vehicle operating conditions wherein independent demands are high.

When the input means exceeds a predetermined r.p.m., spool 77 will move radially outwardly under the influence of centrifugal force to relieve fluid pressure in brake chamber 45. Such selective relief is achieved since conduit 67 will communicate with exhaust port 83 via the suitably arranged ports 84 and 85 formed in spool 77. The torque converter's power absorption capability will increase during such an operating condition wherein implement power demands are low. The preload of spring 79 may be preset to control the precise range of speeds through which regulation of fluid pressure in the brake chamber occurs.

In certain design applications spring 79 could be eliminated and spool 77 suitably lightened and otherwise constructed to perform the desired pressure regulating functions. It should be further understood that adjustment of slippage occurring in brake 39 can be further closely controlled, either manually or automatically, by selective variation of the input fluid pressure at inlet 72. From the above description, it can be seen that the described centrifugal control means provides a desirable alternative for closely and automatically controlling the amount of relative rotation occurring between elements 40 and 46 (FIG. 2) to thus vary the power absorption capability of the torque converter within a predetermined range.

Figure 6:
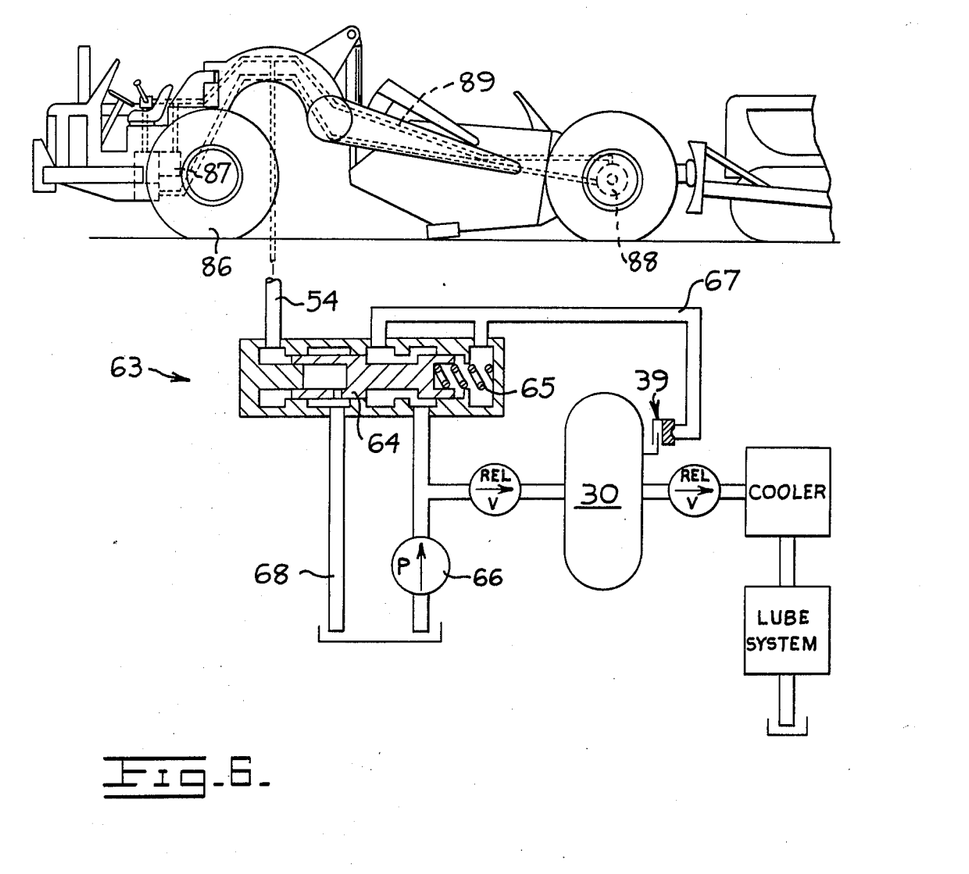
FIG. 6 schematically illustrates a wheel slip control system for use with the FIGS. 2–4 torque converter embodiments.

FIG. 6 schematically illustrates a still further control system embodiment for the FIGS. 2–4 torque converters. The fluid pressure signal for this embodiment is originally generated by the slippage of at least one front ground engaging roadwheel 86 of a vehicle, such as the illustrated tractor-scraper. A pump 87 communicates pressurized fluid to a fluid motor means 88 via conduit 89 to drive the rear wheels in a conventional manner. The hydraulic wheel slip control system is more specifically disclosed in U.S. Patent No. 3,217,826, assigned to the assignee of this application. As indicated by like numerals appearing in this figure, ratio-valve means 63 and related structures are substantially identical to corresponding structures employed in the FIG. 1 control system.

In operation, slippage of a front driving wheel 86 over an amount proportioned by motor means 88 will function to increase fluid pressure in conduit 89 proportionately. Such pressure increase will be communicated through conduit 54 to move spool 64 rightwardly against spring 65. Pressurized fluid from pump 66 will flow past the spool, into conduit 67 and to brake chamber 45 (FIG. 2) to retard rotation of element 40 relative to element 46. Thus, torque converter power absorption capability will be lowered, in substantially the same manner as described in connection with the FIG. 1 control system, to reduce wear of the front driving tires. Conversely, reduced slippage of the front wheels will allow increased amounts of power to them.

Figure 7:
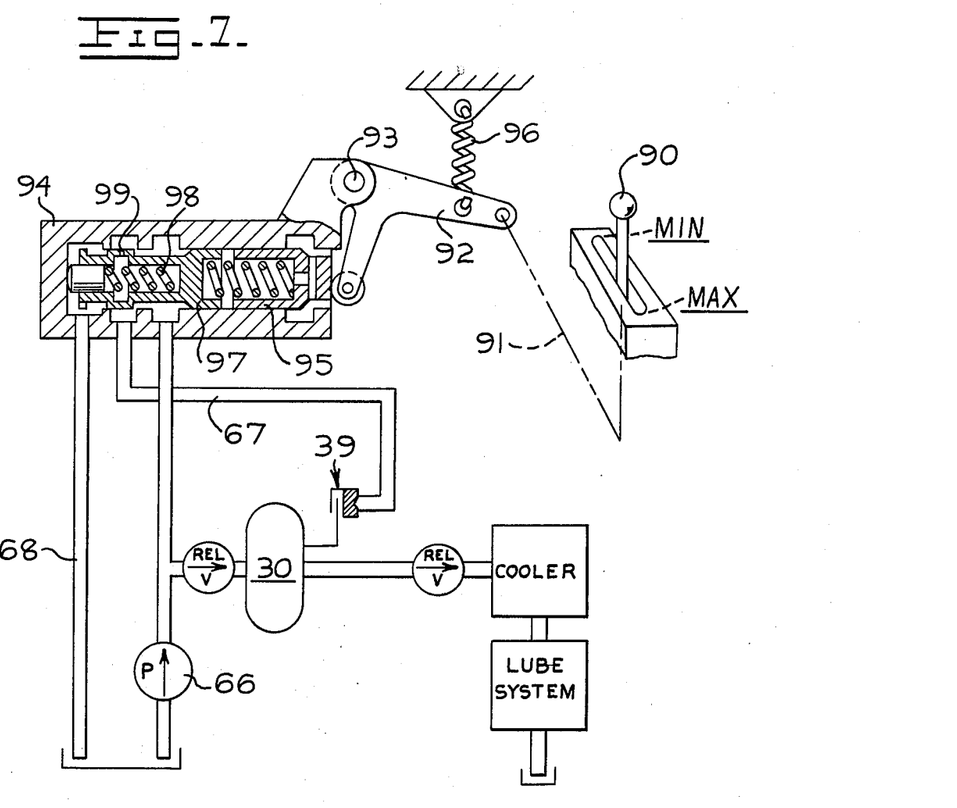
FIG. 7 schematically illustrates a manual control sysstem for use with the FIGS. 2–4 torque converter embodiments.

FIG. 7 schematically illustrates a still further control system embodiment for the FIGS. 2–4 torque converters. The fluid pressure signal means for this control system has manual control means, preferably comprising a handle member 90. The handle member may be movably mounted in the operator's cab of a vehicle to assume an infinite number of positions between the illustrated maximum (MAX.) and minimum (MIN.) slip positions. The handle may be mechanically connected at 91 to a bellcrank 92, pivotally mounted at 93 on a housing 94 of a pressure regulating valve.

The valve may comprise a pressure modulating reducing valve having a plunger 95 slidably mounted in a bore formed in housing 94. A spring means 96 may be arranged to return the bellcrank and handle to the normal MAX. slip position after actuation thereof. Such MAX. position provides maximum power to the vehicle's roadwheels and a predetermined level of power to the implement's drive system. The valve further comprises a spool member 97 and a compressed coil spring mounted between the plunger and spool member to urge them apart.

A second spring 98 bears against a slug mounted in the spool to abut the housing to urge the spool rightwardly. An orifice 99 may be formed in the spool member to communicate pressurized fluid to the chamber containing spring 98.

In operation, the operator may position handle 90 in one of its infinite positions between the MAX. and MIN.

positions to correctly apportion an engine's power output within a predetermined range, between the vehicle's road-wheels and implement system drive. For example, movement of handle 90 from the normal MAX. position towards the MIN. slip position (FIG. 7) will function to pivot lever 92 clockwise about pivot 93. Plunger 95 and spool 97 will move leftwardly to communicate presurized fluid from pump 66, past the lands suitably formed in the valve and to conduit 67 and brake 39.

Simultaneously therewith, communication of brake chamber 45 (FIG. 2) with exhaust conduit 68 will be cut off to permit the chamber to become at least partially pressurized. Consequently, increase in the brake chamber's fluid pressure will function to decrease the amount of relative rotation occurring between elements 40 and 46. Such decrease will accordingly decrease the power absorption capability of the torque converter.

Conversely, movement of handle 90 back towards the MAX. slip position will function to increase the amount of relative rotation occurring between the elements to increase such power absorption capability. It should be understood that conventional detent means (not shown) or the like could be operatively arranged to cooperate with handle 90 to retain the handle in a particular position upon release thereof by the operator. Such detent means could be of the "quick release" type which would release automatically upon further actuation of the handle by the operator. However, in the preferred embodiment no such detent means are employed and spring 98 functions to automatically relieve clutch 39 when handle 90 is returned to its normal MAX. position, upon release thereof by the operator, by spring 96.

FIGS. 8 through 17 disclose torque converters and control systems therefor wherein the two elements of the torque converter for infinitely varying torque converter capacity within a predetermined range comprise the impeller means. In addition, the connecting means operatively connectable with one of the elements to control relative rotation thereof comprises a clutch. The last two numerals depicting various structures comprising the FIGS. 8–17 torque converters and control systems are identical to numerals depicting similar structures appearing in FIGS. 1–7.

Figure 8:
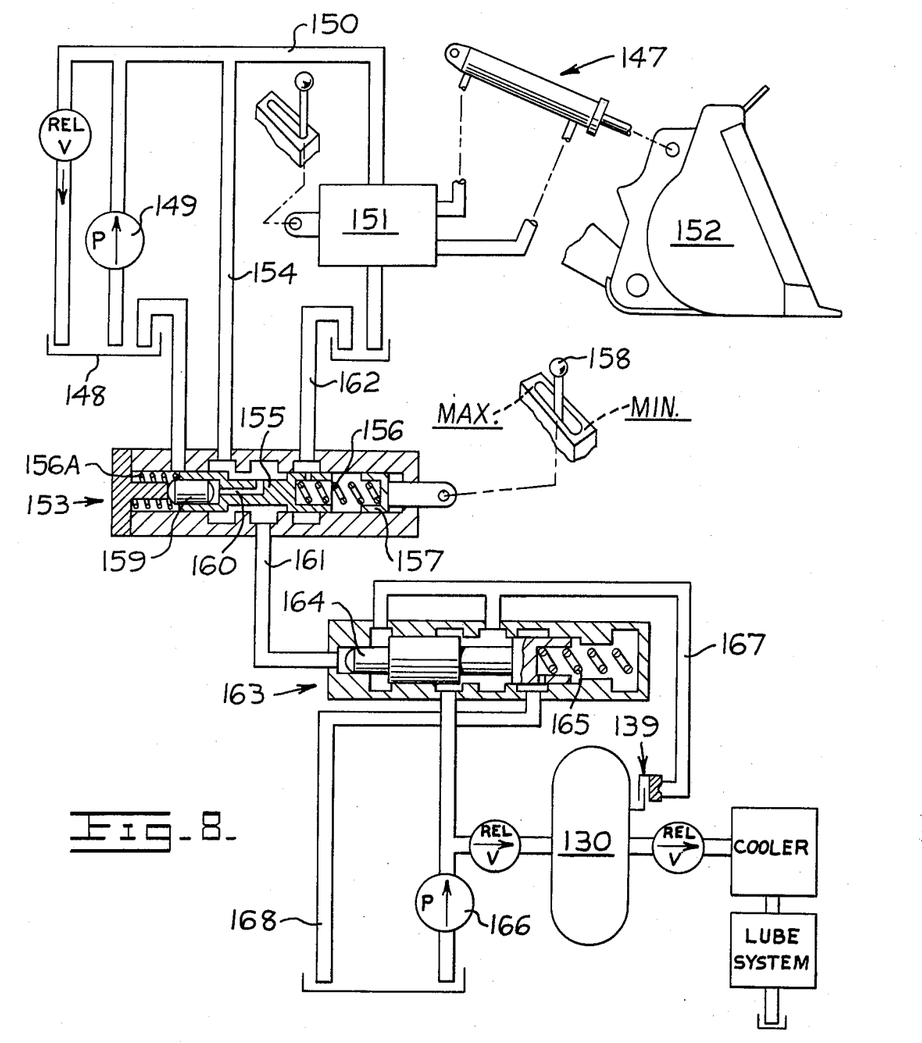
FIG. 8 schematically illustrates a torque converter having a multielement impeller and control system therefor, similar to the FIG. 1 control system.

Referring first to FIG. 8, a control system similar to the FIG. 1 control system comprises fluid pressure signal means in the form of actuating means 147 for generating a variable signal for infinitely varying the power absorption capability of a torque converter 130. Referring briefly to FIG. 15, the torque converter for this control system may comprise turbine means 131, reactor or stator means 132 and pump or impeller means 133 suitably constructed and arranged to multiply torque in a powered drive train.

A power input means 134 may comprise an engine driven flywheel or the like. The turbine means may be suitably mounted for rotation in the torque converter by bearing means 136. The turbine means is connected directly to a power output means or shaft 137 to impart rotation thereto in a conventional manner. A stationary housing, partially shown at 138, may be arranged to support the torque converter. The connecting means for controlling relative rotation occurring between elements 140 and 146 of the impeller means comprises a clutch.

The slipping of the clutch functions to infinitely vary the torque converter's power absorption capability within a predetermined range in response to the pressure levels generated by signal means 147 (FIG. 8). The clutch may comprise circular friction discs 141 suitably splined at 142 for limited axial movement on the annular support position of element 140. Additional, interleaved steel plates may be mounted by the illustrated spline arrangement for limited axial movement on element 146 to compress or release discs 141 therebetween upon actuation of the clutch.

The clutch may further comprise an annular backup plate 143 forming a part of element 146 and an annular piston member 144 reciprocally mounted on input means 134. Element 146 is constructed and arranged to rotate with input 134 on bearing means 135 whereas element 140 is mounted for rotation on element 146 by suitable bearing means. From the above description it can be seen that selective pressurization of an annular chamber 145, either pneumatically or hydraulically, will function to at least partially compress the friction discs together to infinitely control relative rotation occurring between elements 140 and 146.

Referring again to FIG. 8, a reservoir 148, a pump 149, a conduit 150 and a tilt valve 151 comprise means for selectively communicating pressurized fluid to actuating means 147. The rod ends of the actuating means may be mechanically connected to an implement 152, such as a loader bucket, to control various movements thereof in a conventional manner. Pressurized fluid from conduit 150 is also communicated to a throttling valve means 153 via a conduit 154. The throttling valve means comprises a reciprocally mounted spool 155 urged leftwardly against a spring 156a by a spring 156 operatively associated with a plunger 157 and handle 158.

When the spool assumes its FIG. 8 position, pressurized fluid from conduit 150 will pass by the suitably formed lands and cutouts formed in valve 153 and flow into an outlet conduit 161. Valve 153 further functions as a pressure modulating reducing valve in that orifice 160 will permit fluid pressure to build up in the chamber formed between the slug and the spool to modulate the spool's movements. In particular, sufficient pressure buildup in the chamber will function to move the spool rightwardly to relieve fluid pressure to an exhaust conduit 162.

The ratio-valve means comprises a spool 164 reciprocally mounted therein and urged in a leftward direction by spring 165. Pressurized fluid from conduit 161 is communicated to the left end of the spool to urge it rightwardly against the force of the spring. A pump means 166 functions to communicate pressurized fluid to torque converter 130 and also to clutch actuating chamber 145 (FIG. 15) via a conduit 167 upon sufficient leftward movement of the spool (FIG. 8). Simultaneously therewith, the spool functions to cut the chamber off from communication with an exhaust conduit 168.

The above mentioned rightward movement of spool 164 is in direct response to the variable fluid pressure signal generated by actuating means 147. During normal vehicle operation handle 158 is retained in its MIN. position by means of the coil spring positioned between the housing of valve 153 and spool 155 to assure minimum slippage in clutch 139 and maximum power to the vehicle's ground engaging wheels. In contrast thereto, handle 58 of the FIG. 1 control system normally rests in its MAX. slippage position for affording the vehicle's wheel's maximum power. Detent means (not shown) could also be associated with handle 158, in the same manner as described above with reference to handle 58, to releasably retain handle 158 at a selected position upon release thereof by the operator.

In operation, handle 158 may be moved by the operator from the normal MIN. towards the MAX. slippage position and retained at such position (FIG. 8) during a particular phase of vehicle operation. In turn, handle 158 will position spool 155 of valve 153 so that a predetermined pressure drop is allowed to occur across such valve. Actuation of valve 151 to move actuating means 147 and implement 152 will function to increase fluid pressure in line 150 above a predetermined level. Such increased fluid pressure will be communicated through conduit 154 and valve 153 and will be reduced in value when it flows into conduit 161 when fluid pressure in conduit 154 is above the setting of the valve. The resulting reduction in fluid pressure is controlled by the above described presetting of handle 158.

Spool 164 will thus move rightwardly in direct proportion to the increased fluid pressure level prevalent in conduit 161. Pressurized fluid flow from pump 166 will then be reduced to decrease the fluid pressure in conduit 167 and clutch chamber 145 (FIG. 15). It can be seen that further rightward movement of spool 164 will communicate the chamber with the reservoir via conduits 167 and 168 to further relieve the chamber's fluid pressure. Upon such relief, rotation of impeller element 140 relative to element 146 will increase to proportionately decrease the torque converter's power absorption capability.

Conversely, when actuating means 147 requires less power, such as when the vehicle is in its traveling mode of operation and implement 152 is not actuated, fluid pressure in conduit 150 will decrease. Such decreased fluid pressure signal will function to increase the fluid pressure level in brake chamber 145 (FIG. 15) by allowing spring 165 to shift spool 164 leftwardly. Pump 166 will then communicate with conduit 167 and the brake chamber by virtue of the low pressure level prevalent in conduit 161 and the chamber's communication with exhaust conduit 168 will be cut off. Consequently, the torque converter's power absorption capability will increase the desired amount to provide the vehicle's wheels with increased power for traction purposes.

Figures 9, 10, 11, 12, 13, 14:
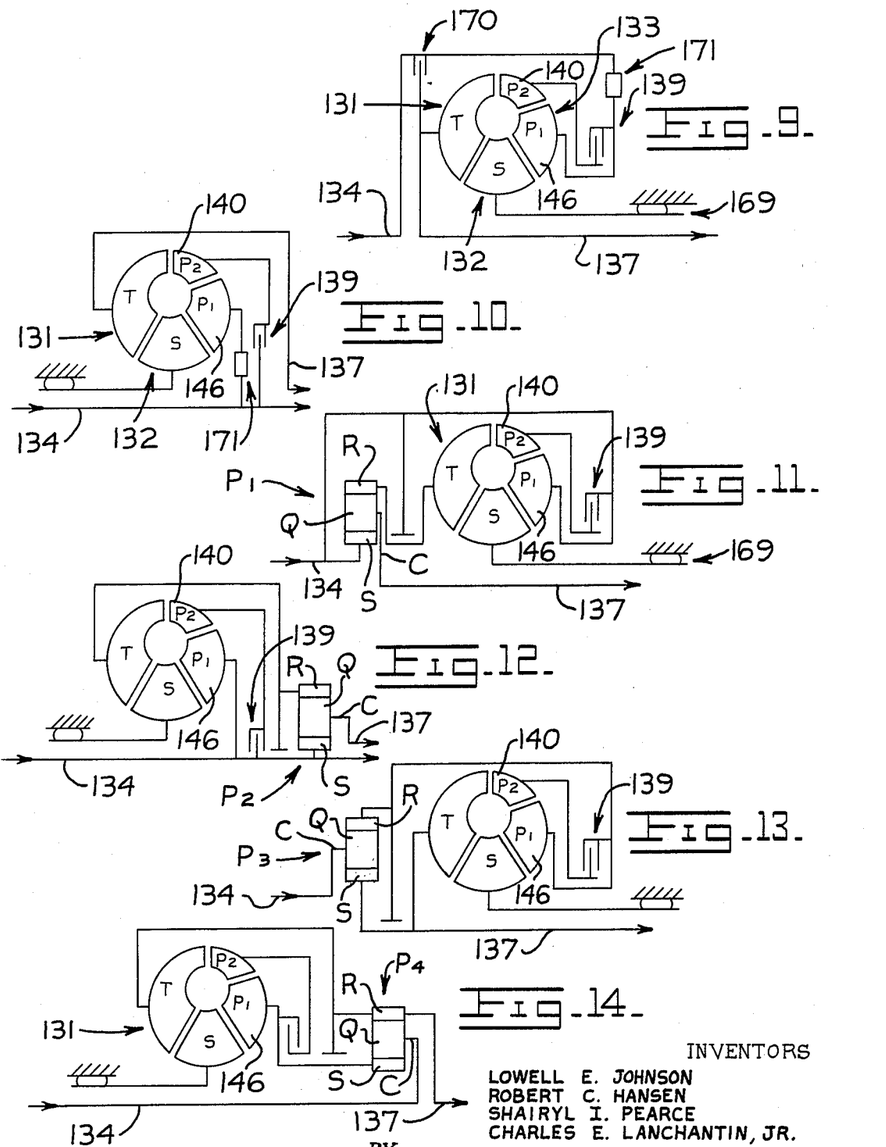
FIGS. 9–15 illustrate various torque converter embodiments each comprising a multielement impeller with FIG. 15 further illustrating a centrifugal control system, similar to the FIG. 5 control system, for use therewith.

FIGS. 9–14 illustrate further torque converter embodiments comprising the split impeller arrangement discussed above with reference to the FIG. 15 torque converter embodiment. FIG. 9, for example, illustrates an overrunning clutch 169 operatively connected to stator means 132 to increase torque converter efficiency at high speed ratios. In addition, a lockup clutch 170 may be actuated by suitable control means (not shown) to selectively lock input means 134 to the turbine means. Thus as high speed ratios, such as those encountered at higher traveling speeds of the vehicle, efficiency of the power train may be improved by mechanically connecting the impeller and turbine members together.

FIG. 10 illustrates another embodiment wherein the power output means is split into first and second output means. Input means 134 is connected directly to impeller element 146 and to the first output means for direct drive purposes through a transmission drive train. Turbine means 131 is connected directly to the second output means or output shaft 137 constituting the converter drive. In this embodiment, the inertia of the rotating system at engine output 134 is sufficiently decreased so that no resilient coupling or the like is required between the engine and torque converter. Such couplings are normally required to avoid vibratory torque problems encountered between the engine and torque converter mass elastic systems.

FIG. 11 illustrates an embodiment wherein a planetary gear set $P_1$ is arranged at the input side of the torque converter. The conventional planetary gearing comprises suitably arranged and intermeshing sun, ring and planet gears with sun gear S connected directly to input means 134. Ring gear R is connected directly to turbine means 131 whereas planet gears Q are connected through carirer C to output means 137. Thus the largest portion of power flow occurs through the torque converter system whereas a smaller portion thereof, such as one-fourth or one-third, is transmitted to output shaft 137 directly via the planetary gear set. Such an arrangement retains known major hydrodynamic torque converter system advantages while yet utilizing known advantages of a straight mechanical system.

FIG. 12 illustrates a planetary gear set $P_2$ added to the above described FIG. 10 embodiment. In particular, sun gear S is connected directly to input means 134 and to a first output means, ring gear R is connected directly to the turbine means and planet gears Q are connected through carrier C to the second output means. Thus, two-thirds of torque output, for example, may be realized via the hydrodynamic path whereas the remaining one-third would occur through a straight mechanical path via the planetary gear set.

FIG. 13 discloses a planetary gear set $P_3$ comprising an input split torque converter embodiment wherein the high inertia loads occur at the input side thereof. In particular, sun gear S is connected directly to output means 137, ring gear R is connected directly to impeller element 146 and planet carrier C is connected to input means 134.

FIG. 14 illustrate an input split planetary gear set $P_4$ positioned at the output side of the torque converter to decrease vibratory torque problems normally occurring between the engine and hydrodynamic system. In particular, sun gear S is connected directly to impeller element 146, ring gear R is connected directly to turbine means 131 and output means 137, and planet carrier C is connected directly to input means 134.

Figure 15:
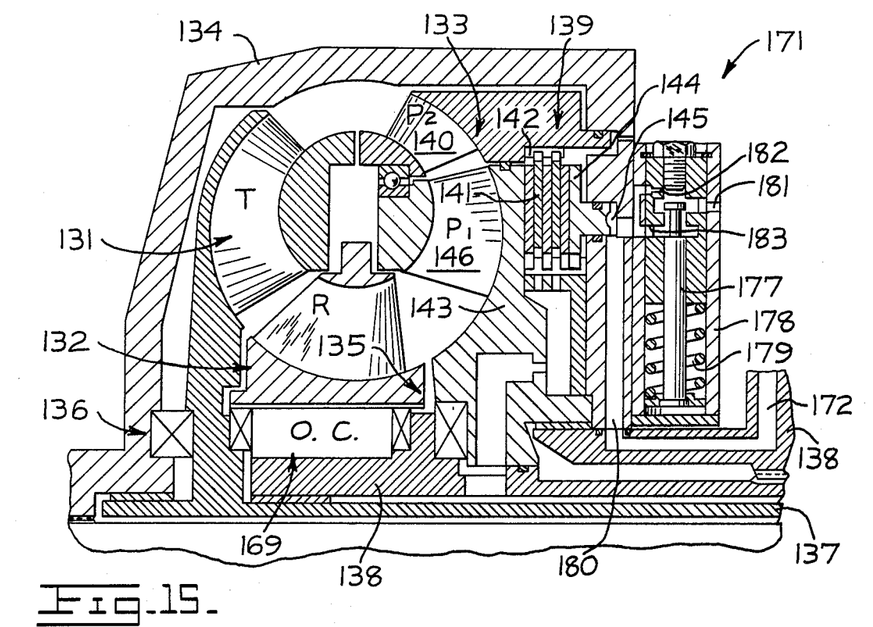

FIG. 15 further illustrates another control system embodiment, similar in some respects to the FIG. 5 control system, for the FIGS. 9–15 torque converters. The fluid pressure signal means for this embodiment comprises centrifugal control means 171, operatively connected to power input means 134 to rotate therewith. The centrifugal control means, per se, is more fully described in U.S. patent application Ser. No. 569,331 to Joachim Horsch et al. for "Power Transmission," filed on Aug. 1, 1966, now Patent No. 3,424,029 and assigned to the assignee of the instant application.

Reservoir and pump means, similar to those disclosed in FIG. 5 for communicating pressurized fluid to inlet 72 are provided for communicating pressurized fluid to an inlet 172 of the centrifugal control means. The centrifugal control means functions to communicate such fluid to clutch 139 to control the amount of relative rotation occurring between elements 140 and 146 in response to the speed of rotation of power input means 134. An internal combustion engine or other suitable power supply means may be arranged to drive input shaft 134 via a suitably arranged gear train and also to drive an implement system drive.

The implement system drive may be arranged to actuate an elecator drive system (not shown), for example, of a conventional tractor-scraper or the like. Thus the implement system drive will reflect engine speed directly. On the other hand, the engine power transmitted to the vehicle's ground-engaging wheels (not shown) via a transmission located downstream of the torque converter (similar to transmission 76 in FIG. 5) may be arranged so that a lowered torque converter power absorption rate would normally decrease drive to such wheels.

The centrifugal control means essentially comprises a valve means having a spool 177 reciprocally mounted in a housing 178. The housing is attached in a suitable manner to input means 134 to rotate therewith. Thus, the spool will move radially outwardly relative to the longitudinal axis of the torque converter upon increased rotation of the power input means. Spring means 179 may be arranged between a portion of the housing and the spool to urge the spool radially inwardly relative to such longitudinal axis.

Oil or other suitable working fluid may be supplied to the valve via inlet 172 to communicate such fluid with clutch 139 via passage 180 and chamber 145. Exhaust port 181 is constructed and arranged to be selectively communicated to brake chamber 145 with drain via orifice 182 and port 183. Port 181 for example, corresponds to drain orifice 57m, disclosed in above-mentioned U.S. patent application Ser. No. 569,331. Such application may be referred to should it become necessary to more fully understand the operation of the herein briefly described centrifugal control means.

In operation, it can be seen that when the r.p.m. of input means 134 exceeds a predetermined amount, that spool 177 will move radially outwardly against the counteracting force of spring 179 to restrict exhaust of clutch chamber 145 via orifice 182. Thus pressurized fluid will be communicated to and at least partially contained in chamber 145 via inlet 172 and passage 180 to effect at least partial engagement of clutch 139 in response to rotation of the input means. Further increase in the speed of input 134 will function to further reduce clutch slippage to increase torque converter capacity proportionately.

Conversely, when the speed of the input means falls below a predetermined amount, spool 177 will move radially inwardly under the influence of spring 179 to the maximum clutch slippage position of FIG. 15. Clutch chamber 145, inlet conduit 172 and passage 180 will thus be placed in direct communication with drain port 181 substantially only through orifice 182. Such restricted relief of fluid pressure in the clutch chamber will function to increase the relative rotation occurring between elements 140 and 146 to decrease torque converter capacity proportionately. The force imparted to spool 177 by spring 179 may be set to precisely set the minimum to maximum range of clutch slippage throughout which pressure regulation occurs. As was the case with FIG. 5 embodiment, spring 179 could be eliminated in certain design applications.

Figure 16:
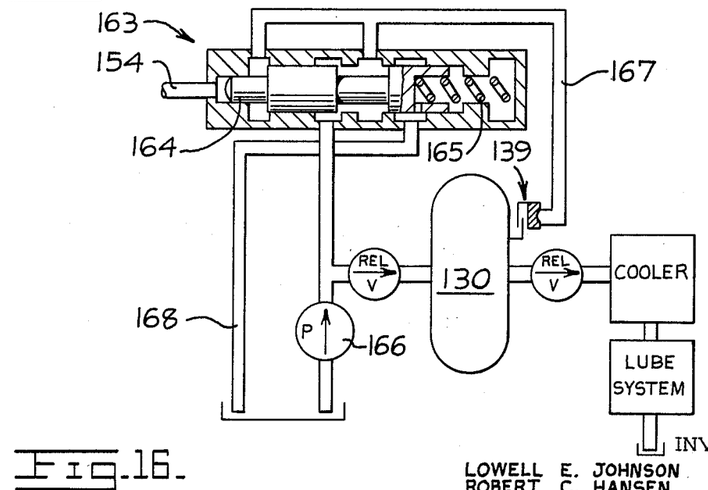
FIG. 16 schematically illustrates a wheel slip control system, similar to the FIG. 6 control system, for use with the FIGS. 9–15 torque converters.

FIG. 16 illustrates a further control system embodiment for the FIGS. 9–15 torque converters. The fluid pressure signal for this embodiment originates due to slippage of at least one ground-engaging or road wheel of a vehicle. Such slippage occurs in a manner similar to that described in connection with the FIG. 6 control system. The rear road wheels (see FIG. 6) may also be driven by suitably arranged pump and fluid motor means (not shown) for the purpose of providing the base signal means as explained in the above-mentioned U.S. Patent No. 3,217,826 and schematically illustrated in FIG. 6.

In operation, slipping of such road wheel over a predetermined amount will function to increase fluid pressure in a conduit 154 in direct proportion to said wheel slip. The fluid pressure increase will function to move a spool 164 of a ratio valve 163 rightwardly against the biasing force of a spring 165. Such movement will effect a pressure drop across the valve resulting in a reduced fluid pressure in conduit 167 and clutch 139. Further rightward movement of the spool will function to cut off supply pump 166 and open clutch chamber 145 (FIG. 15) to exhaust conduit 168. The resulting decrease in the torque converter's power absorption capability will be accompanied by less power being transmitted to the vehicle wheels to save on tire wear and the like. Conversely, reduced slippage of the road wheel will function to increase such power absorption capability within a predetermined range.

Figure 17:
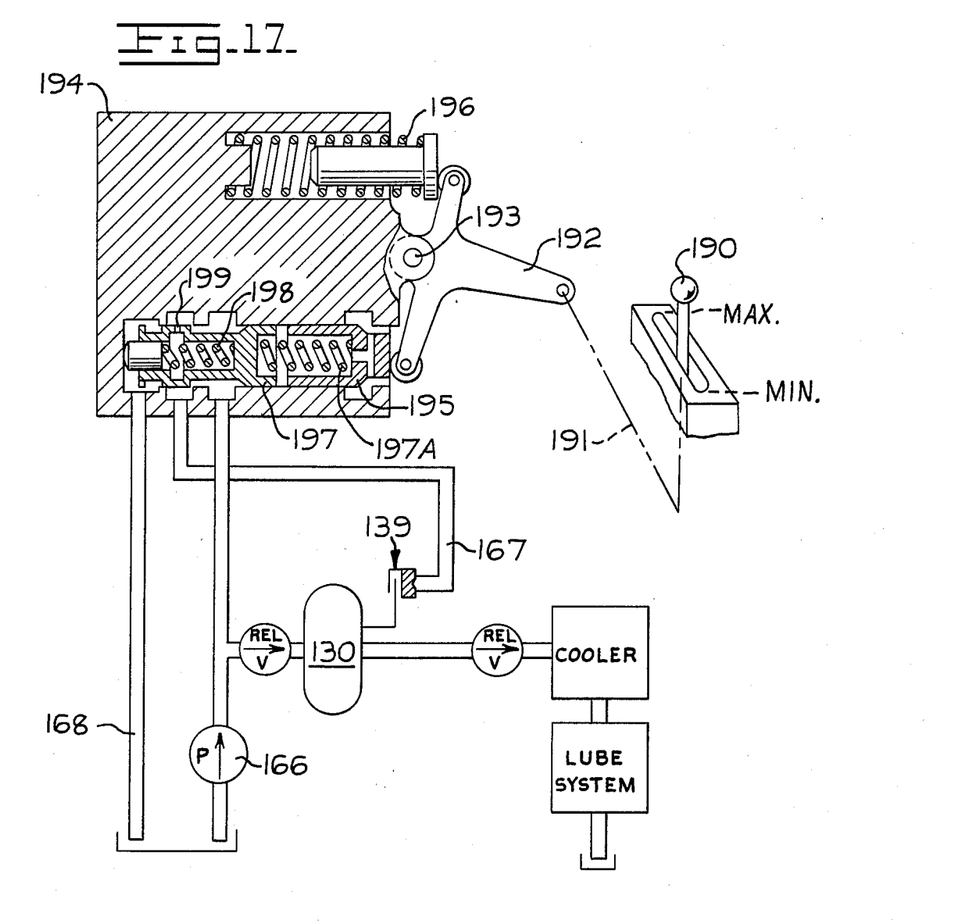
FIG. 17 schematically illustrates a manual control system, similar to the FIG. 7 control system, for use with the FIGS. 9–15 torque converters.

FIG. 17 illustrates a further control system embodiment for the FIGS. 9–15 torque converters wherein the fluid pressure signal means comprises manual control means similar to that disclosed in the FIG. 7 control system. Handle member 190 may be movably mounted on a vehicle to assume an infinite number of positions between the illustrated maximum (MAX.) and minimum (MIN.) slip positions. The maximum and minimum slip positions afford minimum and maximum power inputs to the vehicle's ground engaging wheels respectively.

The handle is mechanically connected by linkage 191 to a bellcrank 192, pivotally mounted at 193 on a housing 194 of a pressure regulating valve. The valve may constitute a plunger 195 slidably mounted in a bore formed in the housing. Spring means 196 may be positioned as shown to return the bellcrank and handle to the MIN. slip position after actuating thereof. Such minimum slip condition is the normal mode of vehicle operation wherein maximum power is transmitted to the wheels thereof.

The valve may further comprise a spool member 197 and a compressed coil spring 197a mounted between the plunger and spool member to urge them apart. A second spring 198 bears against a slug arranged to abut an end wall of the housing to urge the spool member rightwardly. Orifice 199 functions to modulate fluid pressure into the slug chamber substantially in the same manner as orifice 60 of the FIG. 1 control system and orifice 99 of the FIG. 7 control system.

In operation, the operator may move handle 190 from the MIN. towards the MAX. slip positions (FIG. 17) to selectively apportion an engine's power output between the vehicle's rod wheels and an implement system drive (not shown), for example. Such movement will function to pivot bellcrank 192 counterclockwise about pivot 193 to permit spool 197 to move rightwardly under the influence of spring 198 and pressure in this chamber. Flow of pressurized fluid from pump 166, past the suitably formed lands and cutouts of the valve and to clutch chamber 145 (FIG. 15) via conduit 167 is thus restricted.

Further rightward movement of spool 197 will place the clutch chamber and conduit 167 in at least partial communication with exhaust conduit 168 to further increase clutch slippage and proportionately decrease the torque converter's power absorption capability. When handle 190 is moved to the MAX. position to accommodate high power demands for the implement, maximum clutch slippage will occur. Conversely, movement of handle 190 back towards the MIN. slip position will function to decrease clutch slippage to thus increase the torque converter's power absorption capability. Handle 190 may have suitable detent means (not shown) or the like operatively associated therewith to releasably retain the handle in a chosen position upon release by the operator.

It should be noted that various modifications could be made to the above-described systems without departing from the spirit and scope of this invention. For example, the above "signal means" could comprise an electrical signal generated by a suitably arranged source. Also, the brake or clutch could be electrically actuated, for example.

What is claimed is:

1. A torque converter and control system therefor, said torque converter comprising power input means, at least one power output means and turbine means, stator means and impeller means, at least one of said stator and impeller means comprising at least two elements mounted in said torque converter so that one element may rotate relative to the other of said elements, said control system comprising fluid pressure signal means for generating a variable fluid pressure between a minimum level and a maximum level and connecting means operatively connectable with at least said one element to control relative rotation thereof relative to the other one of said elements to infinitely vary the power absorption capability of said torque converter within a predetermined range in response to the pressure level generated by said fluid pressure signal means.

2. The invention of claim 1 wherein said elements comprise said stator means and said connecting means comprises a brake.

3. The invention of claim 2 further comprising an overrunning clutch operatively connected to the other one of said elements.

4. The invention of claim 2 further comprising a lock-up clutch means for operatively connecting said turbine means to said power input means.

5. The invention of claim 1 wherein said elements comprise said impeller means and said connecting means comprises a clutch.

6. The invention of claim 5 further comprising an overrunning clutch operatively connected to said stator means.

7. The invention of claim 5 further comprising a lock-up clutch means for operatively connecting said turbine means to said power input means.

8. The invention of claim 5 wherein said power input means is connected directly to said impeller means and said connecting means and said output means is connected directly to said turbine means.

9. The invention of claim 5 wherein said power output means is split into first and second output means, said input means connected directly to said impeller means and said connecting means and to said first output means and said turbine means connected directly to said second output means.

10. The invention of claim 8 further comprising a planetary gear set comprising intermeshing sun, ring and planet gears, said sun gear connected directly to said input means, said ring gear connected directly to said turbine means and a carrier for said planet gears connected directly to said output means.

11. The invention of claim 9 further comprising a planetary gear set comprising intermeshing sun, ring and planet gears, said sun gear connected directly to said input means and said first output means, said ring gear connected directly to said turbine means and a carrier for said planet gears connected directly to said first and second output means.

12. The invention of claim 8 further comprising a planetary gear set comprising intermeshing sun, ring and planet gears, said sun gear connected directly to said output means, said ring gear connected directly to said impeller means and said connecting means and a carrier for said planet gears connected directly to said input means.

13. The invention of claim 8 further comprising a planetary gear set comprising intermeshing sun, ring and planet gears, said sun gear connected directly to said impeller means and said connecting means, said ring gear connected directly to said turbine means and output means and a carrier for said planet gears connected directly to said input means.

14. The invention of claim 1 wherein said fluid pressure signal means comprises actuating means for moving an implement and said control system further comprises means for communicating pressurized fluid to said actuating means and to said connecting means and valve means for controlling the fluid pressure level in said connecting means to control the amount of relative rotation occurring between said elements in response to the fluid pressure level prevalent in said actuating means.

15. The invention of claim 14 wherein said elements comprise said stator means and said connecting means comprises a brake, said valve means operatively connected to said actuating means and said brake for decreasing the amount of relative rotation occurring between said elements to thus lower the power absorption capability of said torque converter in response to an increase in the fluid pressure level prevalent in said actuating means.

16. The invention of claim 14 wherein said elements comprise said impeller means and said connecting means comprises a clutch, said valve means operatively connected to said actuating means and said clutch for increasing the amount of relative rotation occurring between said elements to thus lower the power absorption capability of said torque converter in response to an increase in the fluid pressure level prevalent in said actuating means.

17. The invention of claim 14 wherein said valve means comprises servo-valve means operatively connected between said actuating means and said connecting means for infinitely modulating fluid flow from said pump means to said connecting means in response to the fluid pressure level prevalent in said actuating means.

18. The invention of claim 17 wherein said servo-valve means comprises a spool movably mounted therein and spring means for urging said spool in a first direction, said actuating means operatively connected to said servo-valve means to have the fluid pressure level thereof communicate with said spool to urge said spool in a second direction opposite to said first direction to oppose the force of said spring means.

19. The invention of claim 17 wherein said valve means further comprises throttling valve means operatively connected between said actuating means and said ratio valve means for limiting the amount of relative rotation between said elements.

20. The invention of claim 1 wherein said fluid pressure signal means comprises centrifugal control means operatively connected to said input means and said control system further comprises means for communicating pressurized fluid to said connecting means through said centrifugal control means, said centrifugal control means further operatively connected to said connecting means to control the amount of relative rotation occurring between said elements in response to the speed of rotation of said input means.

21. The invention of claim 20 wherein said elements comprise said stator means and said connecting means comprises a brake, said centrifugal control means operatively connected to said brake for decreasing the amount of relative rotation occurring between said elements to thus lower the power absorption capability of said torque converter in response to a decrease in the speed of rotation of said input means.

22. The invention of claim 20 wherein said elements comprise said impeller means and said connecting means comprises a clutch, said centrifugal control means operatively connected to said clutch for increasing the amount of relative rotation occurring between said elements to thus lower the power absorption capability of said torque converter in response to a decrease in the speed of rotation of said input means.

23. The invention of claim 20 wherein said centrifugal control means comprises a valve spool mounted on said converter to move radially relative to a longitudinal axis of said torque converter upon rotation of said input means.

24. The invention of claim 23 wherein said centrifugal control means further comprises spring means operatively associated with said spool member to urge said spool member radially relative to said longitudinal axis.

25. The invention of claim 1 wherein said fluid pressure signal means comprises a ground engaging wheel for a vehicle and said control system further comprises means for controlling the amount of relative rotation occurring between said elements in response to wheel slippage.

26. The invention of claim 25 wherein said elements comprise said stator means and said connecting means comprises a brake.

27. The invention of claim 25 wherein said elements comprise said impeller means and said connecting means comprises a clutch.

28. The invention of claim 25 wherein said control system further comprises ratio-valve means for modulating fluid flow to said connecting means.

29. The invention of claim 28 wherein said ratio-valve means comprises a spool movably mounted therein and spring means for urging said spool in a first direction in opposition to a variable fluid pressure signal generated by said wheel.

30. The invention of claim 1 wherein said fluid pressure signal means comprises manual control means and said control system further comprises means for communicating pressurized fluid to said connecting means and valve means operatively associated with said manual control means for controlling the fluid pressure level in said connecting means to control the amount of relative rotation occurring between said elements in response to actuation of said manual control means.

31. The invention of claim 30 wherein said elements comprise said stator means and said connecting means comprises a brake, said valve means operatively associated with said manual control means and said brake for decreasing the amount of relative rotation occurring between said elements to thus lower the power absorption capability of said torque converter in response to actuation of said manual control means.

32. The invention of claim 30 wherein said elements comprise said impeller means and said connecting means comprises a clutch, said valve means operatively associated with said manual control means and said clutch for increasing the amount of relative rotation occurring between said elements to thus lower the power absorption capability of said torque converter in response to actuation of said manual control means.

33. The invention of claim 30 further comprising means for returning said manual control means to its original position after actuation thereof.

34. The invention of claim 30 wherein said manual control means comprises a lever pivoted adjacent to said valve means.

35. The invention of claim 30 wherein said manual control means comprises a handle member movably mounted on a vehicle to assume an infinite number of positions between a first position whereat said valve means is actuated to permit minimum relative movement between said elements and a second position whereat said valve means is actuated to permit maximum relative movement between said elements.

36. The invention of claim 30 wherein said valve means comprises a pressure modulating valve.

37. In a torque converter having turbine means, stator means and impeller means, the improvement which comprises means operatively connectable to at least one of said stator and impeller means for infinitely varying the power absorption capability of said torque converter within a predetermined range of the torque converter's power output.

38. The invention of claim 37 wherein one of said stator and impeller means comprise at least two elements mounted in said torque converter so that one element may rotate relative to the other of said elements, said means operatively associated with said one element.

39. The invention of claim 37 further comprising signal means for communicating a variable signal to said last mentioned means to infinitely vary the power absorption capability of said torque converter in response to said variable signal.

40. The invention of claim 38 wherein said elements comprise said stator means.

41. The invention of claim 38 wherein said elements comprise said impeller means.

42. The invention of claim 39 wherein said signal means comprises actuating means for moving an implement.

43. The invention of claim 39 wherein said signal means comprises centrifugal control means.

44. The invention of claim 39 wherein said signal means comprises a ground engaging wheel for a vehicle.

45. The invention of claim 39 wherein said signal means comprises manual control means operatively associated with said means connected to one of said stator and impeller means.

References Cited

UNITED STATES PATENTS

| | | | |
|---|---|---|---|
| 2,293,767 | 8/1942 | Salerni | 60—54 |
| 2,548,207 | 4/1951 | Dunn | 192—3.29 XR |
| 2,795,154 | 6/1957 | Russell | 60—54 XR |
| 2,803,974 | 8/1957 | Kelley | 60—54 XR |
| 3,258,081 | 6/1966 | Kugel et al. | 60—12 XR |

EDGAR W. GEOGHEGAN, Primary Examiner

U.S. Cl. X.R.

60—54; 192—3.28